United States Patent
McCoy et al.

(10) Patent No.: US 12,318,691 B2
(45) Date of Patent: Jun. 3, 2025

(54) USER PREFERENCE CUSTOMIZED GENERATION OF GAMING MUSIC

(71) Applicant: Sony Interactive Entertainment LLC, San Mateo, CA (US)

(72) Inventors: Charles McCoy, San Diego, CA (US); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/871,273

(22) Filed: Jul. 22, 2022

(65) Prior Publication Data

US 2024/0024775 A1   Jan. 25, 2024

(51) Int. Cl.
  *A63F 13/00*   (2014.01)
  *A63F 13/533*   (2014.01)
  *A63F 13/54*   (2014.01)
  *A63F 13/79*   (2014.01)

(52) U.S. Cl.
  CPC ............ *A63F 13/54* (2014.09); *A63F 13/533* (2014.09); *A63F 13/79* (2014.09); *A63F 2300/6081* (2013.01)

(58) Field of Classification Search
  CPC .......... A63F 13/79; A63F 13/45; A63F 13/69; A63F 13/40; A63F 13/424
  See application file for complete search history.

(56) References Cited

U.S. PATENT DOCUMENTS

| | | | |
|---|---|---|---|
| 7,674,966 B1 | 3/2010 | Pierce | |
| 2006/0058101 A1* | 3/2006 | Rigopulos | A63F 13/63 463/35 |
| 2012/0078997 A1* | 3/2012 | Evans | G06Q 10/00 709/203 |
| 2012/0079276 A1* | 3/2012 | Evans | H04N 21/44029 713/170 |
| 2020/0188790 A1* | 6/2020 | Galuten | A63F 13/212 |
| 2020/0312287 A1 | 10/2020 | Galuten | |

* cited by examiner

*Primary Examiner* — Omkar A Deodhar
*Assistant Examiner* — Eric M Thomas
(74) *Attorney, Agent, or Firm* — Kilpatrick Townsend & Stockton LLP

(57) ABSTRACT

System, process and device configurations are provided for user preference customized generation of gaming music. A method can include detecting at least one user preference for gaming music, determining a game state, and generating gaming music based on the at least one user preference and the game state. Customization of audio and gaming music can have a large impact on a gaming experience. Musical preferences may be collected for users to generate dynamic music and to improve gaming system ability to generate a customized experience. Musical preferences can include one or more of genres, specific song titles, indications of preferred types of music, music identified for certain gaming activities, user feedback, and country of origin. Music may be generated based on emotional cues of a game scene. Music may be controlled to be more prominent or less obtrusive to a game state.

20 Claims, 7 Drawing Sheets

USER PREFERENCE CUSTOMIZED GENERATION OF GAMING MUSIC

CROSS-REFERENCE TO RELATED APPLICATION

This application is concurrently filed with U.S. patent application Ser. No. 17/871,279 titled USER INTERACTION CUSTOMIZED GENERATION OF GAMING MUSIC, U.S. patent Ser. No. 17/871,294 titled CUSTOMIZED AUDIO SPECTRUM GENERATION Application No. OF GAMING MUSIC, U.S. patent application Ser. No. 17/871,303 titled GAME ENVIRONMENT CUSTOMIZED GENERATION OF GAMING MUSIC, and U.S. patent application Ser. No. 17/871,2307 titled INTERFACE CUSTOMIZED GENERATION OF GAMING MUSIC, the specifications of which are hereby expressly incorporated by reference in their entirety.

FIELD

The present disclosure is directed to generating audio for electronic games and customizing game audio and gaming music, including music orchestration, music learning, game design and game generation.

BACKGROUND

Music in electronic games (e.g., video games, computer games, gaming platforms, application-based games, etc.) is generally pre-recorded and played as a loop to accompany video components of the game. Games can often include multiple music recordings for output, the recordings generated during development of a game. There is a desire to increase personalization of music and audio for games and gaming content beyond prerecorded loops. For many electronic games, there is no option or ability of a user to modify music or audio accompaniment beyond controlling volume. Muting game volume may also mute sound effects and other audio output of the game. There exists a desire for personalization of gaming content.

Another issue with game systems is the need to format game elements for different gaming markets. Gaming has a worldwide fan base serving many game titles and different regions. Certain features of a game, such as a musical style, may not be well received by game players. Development for additional markets and regions may be costly and impose additional data requirements for storage. Another difficulty of personalizing games and gaming content is identifying features that will enhance the experience of a user. There exists a need and desire for customized gaming music to compliment user experience.

BRIEF SUMMARY OF THE EMBODIMENTS

Disclosed and described herein are systems, methods and configurations for user preference customized generation of gaming music. In one embodiment, a method is provided for detecting, by a device, at least one user preference for gaming music, determining, by the device, a game state and generating, by the device, gaming music based on the at least one user preference and the game state, wherein the gaming music is generated dynamically to include at least one musical motif, the at least one motif selected based on the at least one user preference and the game state. The method also includes outputting, by the device, the gaming music.

In one embodiment, the at least one user preference for gaming music includes at least one of a music genre, music style, song title, identification of a musical artist, composer, user feedback, and musical preference.

In one embodiment, the at least one user preference for gaming music includes at least one of a country of origin, nationality, geographic region, religious affiliation and language preference.

In one embodiment, detecting the at least one user preference for gaming music includes displaying a user interface including a feedback display element for at least one of entry of a user preference and feedback on gaming music generated by the device.

In one embodiment, detecting the at least one user preference for gaming music includes determining a user preference from user profile data.

In one embodiment, the game state is a current gaming situation within an electronic game.

In one embodiment, generating gaming music includes selection of a musical motif for game elements of the game state, wherein the selection of the motif is directed by the at least one user preference.

In one embodiment, generating gaming music includes selection of a music library based on the user preference and generating the gaming music from one or more motifs of the music library.

In one embodiment, generating gaming music includes selecting musical style based on at least one of cultural parameter and language parameter.

In one embodiment, outputting the gaming music includes output of dynamic music in coordination with output of gaming content and controlling prominence of gaming music relative to output of gaming content.

Another embodiment is directed to directed to a device configured for user preference customized generation of gaming music. The device includes a memory storing executable instructions and a controller, coupled to the memory. The controller is configured to detect at least one user preference for gaming music, determine a game state and generate gaming music based on the at least one user preference and the game state, wherein the gaming music is generated dynamically to include at least one musical motif, the at least one motif selected based on the at least one user preference and the game state. The controller is also configured to output the gaming music.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
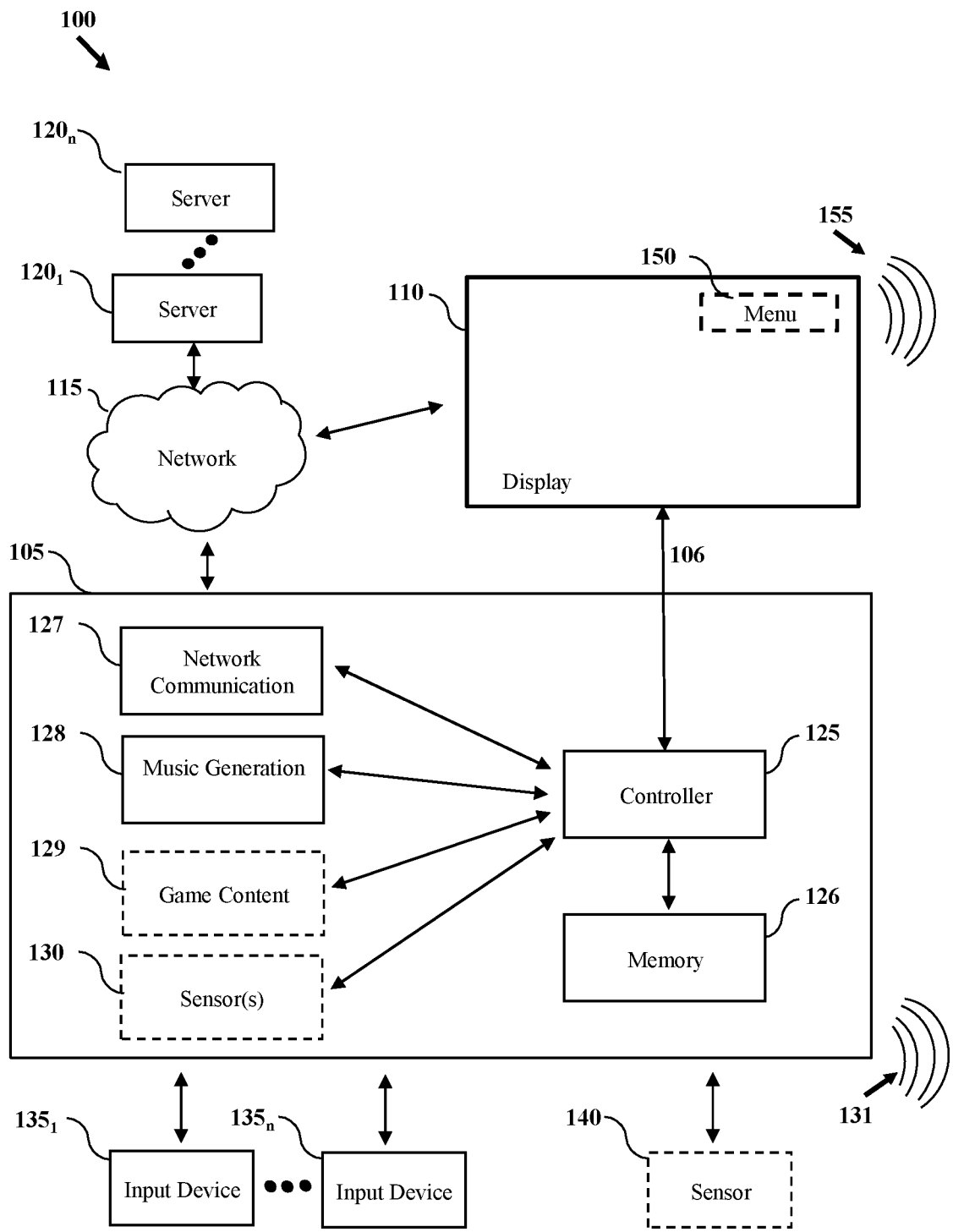
FIG. 1 is a graphical representation of customized music generation according to one or more embodiments.

One aspect of the disclosure is directed to generating customized game audio, such as gaming music and gaming sound effects. By customizing operations and audio generation, gaming audio may be more personalized and output may be tailored to a user, user environment and user condition. Processes and frameworks are provided for enabling devices, such as gaming consoles, and systems to generate game audio. Features discussed herein referring to gaming music may be applied to other types of audio, including but not limited to sound effects. In addition, generating gaming music as discussed herein may include generating musical and/or non-musical audio accompaniment for an electronic game. It should be appreciated that gaming music may include one or more sound voicings, such as vocal and/or instrumental sounds in such a way as to produce a sounds which can include an arrangement of sound having melody, rhythm and in some cases harmony. Gaming music may be generated as one or more tracks for output. According to embodiments, gaming music is generated and output dynamically, such that the audio output is determined and output by a device during game play.

Embodiments are directed to user preference customized generation of gaming music. Systems and methods can include determining at least one user preference for gaming music, determining a game state, and generating music based on the at least one user preference and the game state. Customization of audio and gaming music can have a large impact on a gaming experience. Musical preferences may be collected for users to generate dynamic music and to improve a gaming system's ability to generate a customized experience. Musical preferences can include identification of one or more of genres, specific song titles, indications of preferred types of music, music identified for certain gaming activities, user feedback, spoken language, seed music, and country of origin. Musical preferences can include rankings or orders of play for musical styles, tracks, volume, frequencies and output. According to embodiments, gaming music may be generated based on emotional cues of a game scene. Music may be controlled to be more prominent or less obtrusive to a game state.

Embodiments are directed to user interaction customized generation of gaming music. Systems and methods are provided for generating a customized musical accompaniment for electronic games. Methods can include determining at least one user interaction with a gaming system directed to generated music, updating a parameter for music generation based on the at least one user interaction, and generating a musical component for the gaming system based on the parameters. Musical interactions with the gaming system may be collected during gameplay to train and retrain a dynamic music generator. Retraining may be performed for dynamic music generation interfering with output of sound effects of the electronic game. Inputs may be provided by sensors of the gaming system to detect interactions and control of dynamic music during gameplay. Inputs may include detecting presence of viewers and user environment to modify at least one output characteristic of dynamically generated music and, as a result, generate user presence customized generation of gaming music.

Embodiments are directed to frequency range customized generation of gaming music. Systems and methods are provided for generating a customized musical accompaniment for electronic games. Methods can include detecting user interaction with a gaming system for a frequency component of generated music, updating the dynamic music generated based on the user interaction to modify at least one frequency output characteristic, and outputting modified music. Frequency or tonalities of generated music that interfere with gameplay sound effects may be adjusted to improve gameplay. In some cases volume of sound elements may be shifted in volume and/or pitch to indicate presence of gaming elements or opportunities during gameplay. Similarly, frequency ranges may be customized to avoid one or more frequencies for a user, such as a frequency range identified as being associated with hearing loss or with causing a disturbance, such as vibration.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 is a graphical representation of customized music generation according to one or more embodiments. According to embodiments, customized music generation may be provided by a device and/or a system. A system can include one or more components and devices. FIG. 1 illustrates system 100 according to embodiments which can include device 105. Device 105 may be one or more of a gaming console, computing device and electronic device in general configured to output gaming content 106 to a display. With respect to gaming content, device 105 may be configured to output data for presentation by a display, or visual output device in general, including graphics (2D and 3D), sound and data. Device 105 may also be configured to output non-gaming content, such as video content, visual content, audio content, etc. Embodiments describe generating dynamic gaming music for electronic games and gaming, however it should be appreciated that the principles of the disclosure may be applied to other forms of media and non-gaming content. As such, device 105 and system 100 may be used to generate customized music for one or more applications.

According to embodiments, device 105 is configured to output data 106 and/or content to display 110. According to embodiments, display 110 may be separate from or part of device 105. Device 105 may be configured for network communication by way of network 115 with one or more servers $120_{1-n}$. Device 105 may be configured to receive one or more of user data, game data and music data from servers $120_{1-n}$. Servers $120_{1-n}$ may be configured to store one or more of user data, game data and music data.

FIG. 1 depicts a device configuration according to embodiments. Device 105 may relate to a console, media device, and/or handheld device configured for generation of gaming music. According to embodiments, device 105 includes controller 125, and memory 126. Device 105 may also include network communication module 127, and music generation module 128. Device 105 may also optionally include game content 129 and one or more sensors 130.

Controller 125 may relate to a processor or control device configured to execute one or more operations stored in memory 126, such as processes for generation of gaming music. Controller 105 may be coupled to memory 126, network communication module 127, and music generation module 128. Memory 126 may be non-transitory memory configured to provide data storage and working memory operations for device 105. Memory 126 may be configured to store computer readable instructions for execution by controller 125 for one or more processes described herein. Network communication module 127 may be a communications module configured to receive and transmit network communication data. According to one embodiment, controller 125 may be configured to determine one or more parameters and user preferences for gaming music. One or more of user preferences, interactions and parameters for dynamic music generation may be determined and used by controller 125. According to embodiments, music generation module 128 may perform music generation operations. Music generation module 128 may include voicings, musical motifs, musical patterns and parameters to generate music for a game, including prior to, during and post-game play. In addition to gaming, dynamic music generation may be performed for presentation of menus and/or in association with operations of device 105 to act as a gaming console. Music generation module 128 may be configured to perform one or more learning or training operations to allow for music generation. Music generation module 128 may also store one or more data parameters for use in generating gaming music.

Device 105 may be configured to receive gaming media (e.g., card, cartridge, disk, etc.) and output visual and audio content of the gaming media to display 110. Device 105 may be configured to receive data from one or more of servers $120_{1-n}$ to present and output game content, which may be stored in memory 126. For network games, device 105 may receive game data from a network source, such as servers $120_{1-n}$, and may be configured to generate gaming music for the game data.

According to embodiments, device 105 may include one or more optional sensors 130. Optional sensors 130 may include one or more of audio (e.g., sound), optical (e.g., camera) and spatial (e.g., presence, proximity, etc.) sensors for one or more of collecting user feedback, sensing user environment and for generating gaming music in general. Device may include one or more speakers to generated audio output, shown as audio 131. When connected to an external device, such as display 110, one or more speakers of the external device may be used to output audio.

Device 105 may be configured to receive input from one or more peripheral devices, such as input devices $135_{1-n}$. Input devices $135_{1-n}$ may be controllers or input devices in general configured to provide controls for device 105 and game control. Device 105 may be configured to operate with one or more external sensors, such as optional sensor 140. Optional sensor 140 may be configured to detect audio in the location of a user, and/or presence of viewers. Display 110 may include sensors, such as optional sensors 140.

System 100 may include display 110 for output of visual and audio of an electronic game and/or output of device 105. According to embodiments, display 110 may display control elements of device 105, such as optional menu 150, which may be used to interface with device 105. Display 110 may output audio 155 based on data 106 received from device 105.

According to embodiments, device 105 may be configured to generate gaming music based on user preferences. According to other embodiments, device 105 may be configured to generate gaming music based on user interactions with a gaming system. In yet other embodiments, device 100 may generate gaming music based on parameters for customized audio spectrum generation. Device 100 may utilize one or more operations of processes 200, 600 and 800 and processes in general described herein. It should also be appreciated that system 100 and its components may be configured to perform operations of device 105.

System, devices and processes are described herein to generate gaming audio, such as gaming music. According to embodiments, gaming audio may be generated dynamically, such that it is not pre-constructed. Dynamic gaming music may be generated to include audio having one or more of a melody, rhythm, and harmony. Dynamic gaming music may be generated to include one or more tones (e.g., notes), tone progressions, rhythmic beats, and percussive elements provided by one or more musical voicings (e.g., instruments, synthesizers, etc.). Unlike conventional gaming music which is prerecorded, dynamic gaming music may be generated by system 100 or device 105 for a current gaming situation, player and game play environment. Dynamic music may be generated using one or more motifs trained to include one or more of melody, rhythm, and harmony components, such that device 105 may use a motif to generate audio output for the game based on a game situation and/or one or more parameters. In the context of user preference customized generation of gaming music, device 105 may generate music for the launch screen of a game title, such that one or more music motifs are selected, and the device selects one or more voicings for the motifs based on the game. According to embodiments, selection of a motif, selections of voicings and output of the motif may be based on a user preference. As discussed herein, electronic gaming is a worldwide activity, accordingly popular music in one region of the world may favor music with strong rhythmic components, whereas another region may favor more ambient sounds. Moreover, a user preference may not match with musical styles associated with a region. Embodiments allow for tailoring and modifying dynamic music to account for a particular user without requiring a game developer to generate a near infinite number of pre-recorded tracks.

By providing dynamic gaming music, system 100 and device 105 can provide many forms of musical output. According to embodiments, user preference customized generation of gaming music is provided to customize dynamically generated gaming music to provide a more personalized experience. Technically, dynamically generated gaming music does not require pre-recording of music for each user's preference. As discussed herein user preference can include one or more preferences directed to a musical style, genre, specific title, indications of preferred types of music, music identified for certain gaming activities, user feedback, country of origin, worldwide region, language preference and even user environment.

Figure 2:
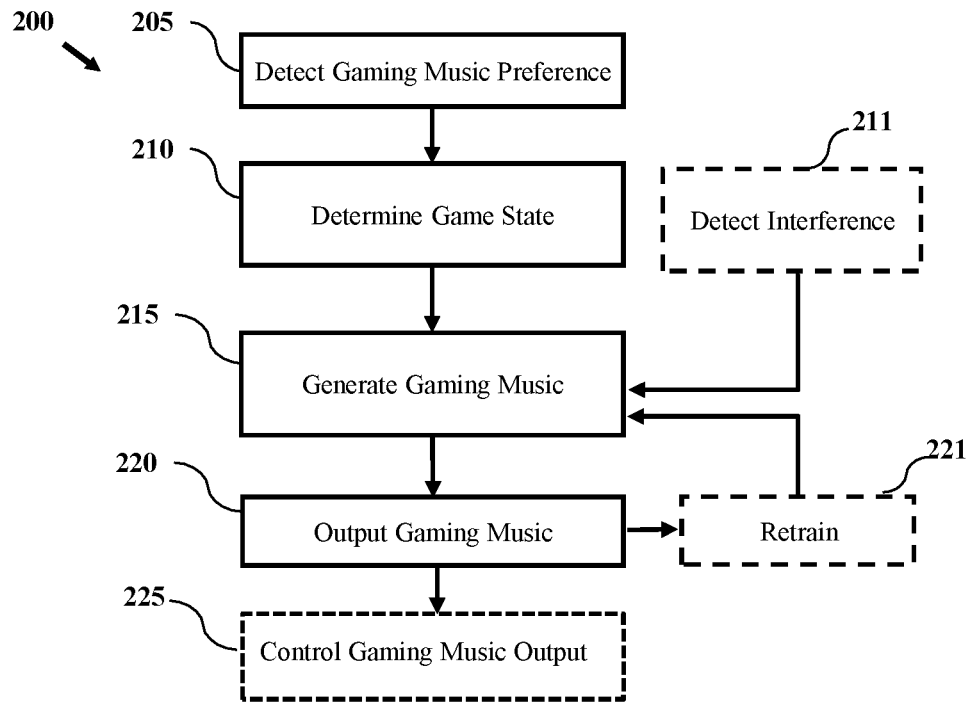
FIG. 2 illustrates a process for user preference customized music generation according to one or more embodiments.

FIG. 2 illustrates a process for user preference customized music generation according to one or more embodiments. Process 200 may use one or more user preferences to generate gaming music. Process 200 may be employed by a device, such as device 105 and/or controller 125 of FIG. 1, to generate gaming music based on at least one user preference for one or more users (e.g., players) of a game. Process 200 may also be performed to aid in generating dynamically generated music. Dynamic generated game audio may be generated for a current game situation, that is not pre-constructed, and as such, can provide flexibility to customize the audio to one or more of a current gaming situation and player that will hear the audio. Process 200 provides solutions to prevent content provided that is not desirable to a user. Process 200 may be initiated by a device (e.g., device 105) detecting at least one user preference for gaming music at block 205. One or more user preferences may be determined for a user. A gaming device, console or system may identify a user through selection of a user profile. In the absence of a user profile, the device may be associated a user with one or more of an account, sign-in and identifier (e.g., email address, call sign, etc.). According to embodiments, detecting the at least one user preference for gaming music includes determining a user preference from user profile data. Profile data may include one or more of language of preference, region of preference, user location and user selections with a gaming system.

Detecting a gaming music preference for a user and information about users may be collected actively and/or passively by a device. Passive collection of information can be accomplished through music choices that the player has made on the same system or a device in which the game is played, such as songs played, or playlists created by the player. When determining a user preference, more emphasis can be placed on songs played by the player while playing games of a similar style. Passive collection may also include collection of data from a user profile. Process 200 may include detecting player preferences from one or more devices and network systems by way of an application programming interface (API).

Active gathering of player preferences at block 205 can include allowing the player to specify their musical desires through a user interface. Detecting a gaming music preference in process 200 may include controlling display of a user interface (e.g., menu 150) including one or more graphical element to obtain user preferences. The interface can include elements to request and obtain a user for preferences of genres or songs. The user interface can request information about aspects of preferred music, such as musical instruments to use and/or not to use. According to embodiments, information may be gathered by way of a gaming console user interface, or interface of a game. When the user interface is provided by the system, user/player preferences may be available to multiple games. A player can set up default music preferences and then customize those preferences on a game-by-game basis. A player might have multiple preferences and can choose a different preference when playing a game based on the mood they are in at the time.

According to embodiments, detecting user preferences can include receiving a user's opinion for a set of music clips played by the device. A user interface of the device can obtain the user's opinion of each musical clip, indications of emotions a user player associates with that musical clip, and rankings of one or more qualities describing the musical feel, such as energy level, complexity, and game type. Detecting the at least one user preference for gaming music can include displaying a user interface including a feedback display element for at least one of entry of a user preference and feedback on gaming music generated by the device.

According to embodiments, preferences can include user feedback for generated music to be less obtrusive in order to focus on other aspects of game play, or more prominent in order to increase emotions or feelings invoked by music in the game. These user preferences may be incorporated in gaming music by controlling aspects of the music that is generated for the game play other than the overall music volume.

According to embodiments, user preferences for gaming music may be detected at block 205 for at least one of a music genre, music style, song title, identification of a musical artist, composer, user feedback, and musical preference. Generation of gaming music may include generating one more musical components such as a melody, ambient noise and synthesized sounds. According to embodiments, user preferences may be employed to customize gaming music to user preference and/or desired style of output. This will also allow a user to have a musical genre and style that is enjoyed when playing a game, while still having music that conveys the feeling of the game and different aspects of the game play. Such customization of the music to the user can make the same game more appealing to a wider audience, with the genre and style of music being different based on preferences of a user playing the game. Having the music generated for game play targeted to the preferences of a player will differentiate game play streaming and videos between players beyond just the differences in play style. This can help players attract more dedicated fans that enjoy watching their game play over the game play of other players. This diversity in music can allow a game to attract loyal fan bases from a more diverse range of backgrounds.

According to embodiments, user preferences for gaming music may include at least one of a country of origin, nationality, geographic region, religious affiliation and language preference. Different sounds can have different meanings in different cultures or to speakers of different languages. Music and sound generation can account for sounds using a language setting for the game and the region or country in which the game is being played. In embodiments, users may override localization settings.

At block 210, process 200 may include determining a game state. The game state may be a current gaming situation within an electronic game, such as a control or menu screen, portion of game play and transition of gameplay. In order to connect with a user, the device may be configured to generate appropriate music to accompany the game state. Data from the game may provide metadata or game vector data including one or more of a mood or parameter associated with the game play by way of a game state. A game state may also include sound elements generated for the game, such as sound effects and alerts. According to embodiments, a device may be configured to determine a game state from game media, such as determining a stage of game play, menu screen or transition from game play to game controls based on graphical output.

At block 215, process 200 includes generating game music. According to embodiments, generating gaming music at block 215 of process 200 can include generating one or more of audio, sounds and music, such as gaming music, based on the at least one user preference. Generating gaming music at block 215 may also be based on a game state. The game state, whether there is an emotion or action in the game, will have information that can be used by a device. By way of example, a driving game with high speed may have a game state indicating upbeat music to be generated for the game play. Accordingly, music may be generated by process 200 to include an upbeat pattern. Another game situation may call for an ethereal or ambient noise to be output that may be more associated with synthesizer (e.g., synth sounds) style of voicing. According to embodiments, generating gaming music at block 215 includes using at least one musical motif, the at least one motif selected based on the at least one user preference and the game state. Generating music may include different forms and styles. Motifs may be incorporated with different voicings or sound databases to generate audio output. By way of example, a motif may include an arrangement of a melody and rhythm, such that generating music may include modifying and/or selecting an output of rhythm based on user preference. A first motif may be used to generate a first and a second form of gaming music, the first and second forms of gaming music having at least one differentiating characteristic. When a user preference, for example includes a genre, such as rock music, generating music can include defining a rhythm pattern (e.g., 4 on the floor), bass line, and electric guitar for the motif. If a user preference includes a genre for dance music, then a different voicing selection and rhythm may be applied to a motif. Alternatively or in combination, a different motif may be selected based on a user preference. In addition, music generation may be dynamically created, such as by the device on the spot.

According to embodiments, selection of a musical motif may be based on one or more of a game element of a game state and selection may be directed by the at least one user preference. According to one embodiment, a device may identify one or more motifs for output for a game directed to a gaming state, selection of at least one motif may be directed by the user preference. According to embodiments, music generation can be based on information from a game (e.g., game media, game code, game data, etc.) about what emotions the game is trying to evoke in the player during e game state and can use that information to create music targeted to be profile of the current player to best elicit the desired emotions in the player. Process 200 can be seeded with music that is labeled with the emotions that the music typically evokes in people. Such emotional labels may differ based on factors such as culture, geography, musical tastes, gender, or age. Processes according to these embodiment can take these differences into account along with the profile information about the player to best align the set of labels that it pays most attention to with the player.

Generating gaming music may include selection of a music library based on the user preference and generating the gaming music from one or more motifs of the music library. A music library may relate to one or more of music stored on a device, music associated with a user and a music library of a network service. Generating gaming music includes selecting a musical style based on at least one of cultural parameter and language parameter.

Process 200 may optionally include detecting interference at block 211. According to embodiments, process 200 may be configured to detect audio output by a device (e.g., gaming music) and one or more sounds relative to a device. By way of example, detecting interference at block 211 may detect audio output of gaming music that interferes with game sound effects. When gaming music is too similar to sound effects of a game, generating gaming music at block 215 may adjust gaming music to not interfere. Similarly, when gaming music generates sounds that cause a disturbance such as a vibration, generating gaming music at block 215 may adjust gaming music to reduce and/or eliminate the disturbance by modifying output characteristics.

At block 220, process 200 includes outputting gaming music. Outputting gaming music includes output of dynamic music in coordination with output of gaming content and controlling prominence of gaming music relative to output of gaming content. At block 220, process 200 may include output of gaming music to a terminal coupled to a display or media device.

According to embodiments, output of gaming music at block 220 may be to speakers of a device. According to yet other embodiments, output may be to a network connection. According to embodiments, process 200 may optionally include retraining parameters for generating gaming music at block 221. Retraining at block 221 may include modifying one or more parameters for generating gaming music based on one or more of user preferences, user interactions, and feedback from a user.

Process 200 may include optional block 225 for controlling gaming music output. Output of gaming music may include controlling one or more of melody, rhythm, and style of output based on game play. For example, situations of heightened pressure in a game, such as nearing completion of a task or defeating an obstacle, may be detected by the device based on a game vector and as such one or more characteristics of gaming music may be adjusted at block 225. According to embodiments, controlling gaming music output at block 225 may include modifying one or more motifs selected in response to a change in game state. According to embodiments, controlling gaming music output at block 225 may include terminating output of gaming music. Controlling gaming music output may be based on one or more user inputs to a device.

Figure 3:
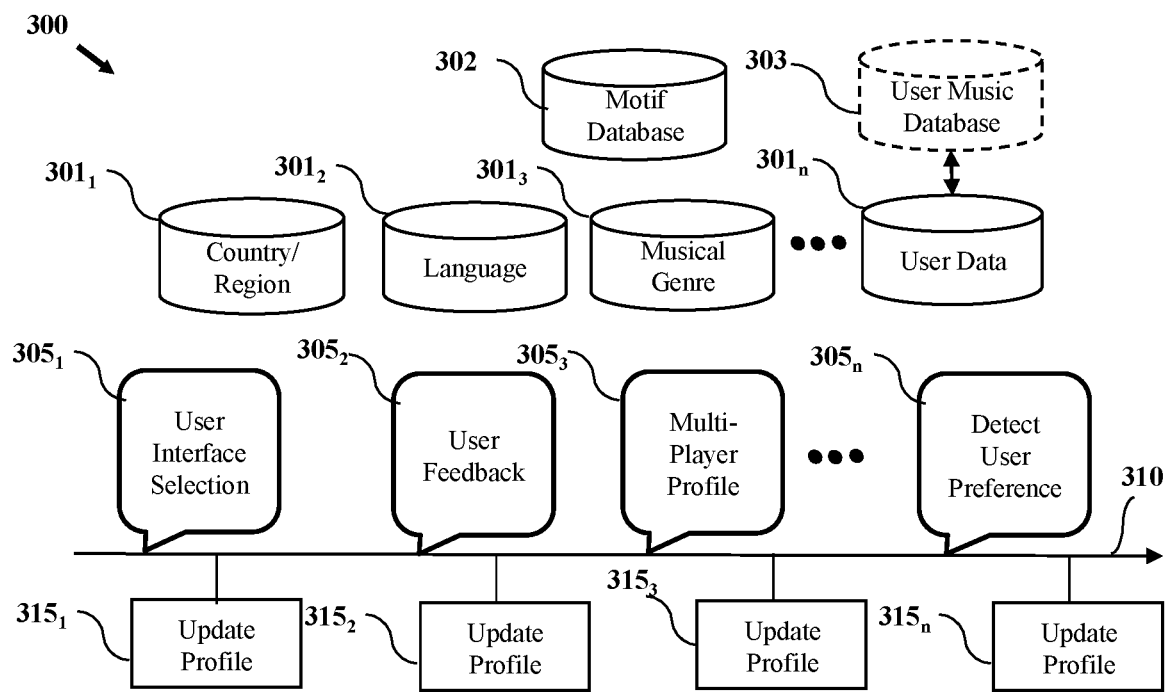
FIG. 3 illustrates a graphical representation of user preference customization according to one or more embodiments.

FIG. 3 illustrates a graphical representation of user preference customization according to one or more embodiments. According to embodiments, generating gaming music and generating game audio may be based on parameters to define one or more attributes of the music and/or audio to be output. Parameters may be used to define motifs that may be combined. A device may store parameters 300 for output of music and audio. A device may also store parameters for a user including one or more of a preference, ranking, game specific selection, history of music played, user interactions and user feedback. Parameters may be stored in libraries $301_{1-n}$. According to embodiments, country/region library $301_1$ can store one or more musical patterns, rhythms and sounds for each of a plurality of regions, and countries. By way of example, a North American region may include musical styles including but not limited to rock, country, hip-hop and classical music styles. Alternatively, a European region may include musical styles including but not limited to dance, traditional music, rock, and popular music. Country/region library $301_1$ may include parameters to identify music and audio preferences for one or more particular countries, regions of a country, and geographic regions. Country/region library $301_1$ may also include a global category including all music styles of the system. Language library $301_2$ may include one or more terms, or sounds associated with a language. According to embodiments, language library $301_2$ may identify one or more sounds to avoid, such as an unpleasant sound or offensive language associated with one or more user preferences for language and/or nationality. Accordingly, generating gaming music may avoid one or more sounds associated with a user preference of sounds to avoid mapped to one or more languages and nationalities.

According to embodiments, musical genre library $301_3$ can store one or more characteristics of music associated with musical genres including chord progressions, rhythmic patterns, voicings, fills, and song structure. User data library $301_n$ can store one or more preferences or parameters associated with a user. According to embodiments, user data library $301_n$ can store one or more dynamically generated tracks or playlists for replaying by a user. According to embodiments, user data library $301_n$ can store one or more preferences or parameters associated sounds to be avoided and sound outputs to avoid. By way of example user data library $301_n$ can store one or more user preferences, which may be user indicated and/or detected by a device, for individual sounds or sound categories to avoid including one or more of high-pitched sounds and sounds with sudden changes in volume (e.g., increasing, decreasing, etc.). User data library $301_n$ can store one or more preferences or parameters associated with a user's religious affiliation.

A device may also use a motif database 302 including one or more motifs that can be used to generate music. Motifs may be associated with one or more of emotions and situations associated with a game. For example, a game including a chase scenario may include music to accompany the chase with one or more motifs associated with a level of risk or stage of the chase. Motifs can also provide building blocks of song elements that may be used to generate music that is not an arbitrary collection of sound. According to embodiments, motif database may include song elements that are generated from machine learning to generate music and/or audio elements for gaming. According to embodiments, a device may optionally obtain or identify music from a user music database 303 that may be stored with one or more of a device or network location. A device and system described herein can be configured to pull or read one or more of musical artists, songs and playlists associated with one or more accounts that may be linked to a user.

Parameters 300 may be stored by a device (e.g., device 105) and/or in a network location (e.g., servers $120_{1-n}$) accessible to the device. Dynamic music generation may be based on parameters 300 and one or more user preferences. According to embodiments, user preferences detected for one or more users may be stored by a device (e.g., device 105). When a device generates gaming music or gaming audio, one or more interactions with the device may be used for one or more of identifying, setting and storing parameters to generate gaming music and audio.

FIG. 3 illustrates user interactions $305_{1-n}$ associated with gaming music 310 output by a device. During gameplay and/or presentation of a game menu, gaming music 310 may be output and a device may detect one or more user interactions, such as user interactions $305_{1-n}$. A device may be configured to update a user profile, such as actions to update profile $315_{1-n}$. According to embodiments, one or more user interface selections, such as user interface selection $305_1$ may be detected and a profile of a user may be updated, update profile $315_1$, in response to the selection. By way of example, a user interface selection to indicate a preference of country/region, language, musical genre and gaming music in general may result in the device determining/updating a parameter for generating music. User interface selections may be one or more of a menu selection, volume control, mute action and game control. User feedback $305_2$ may be one or more of a rating, review, acceptance and cancellation of gaming music output by the device. As a result of user feedback $305_2$, update profile $315_2$ may be performed. Multi-player profile $305_3$ may be one or more preferences for a multiplayer gaming environment for gaming music. As a result of multi-player profile $305_3$, update profile $315_3$ may be performed. According to embodiments, detected user preferences $305_n$ may be one or more preferences determined by a device for gaming music, including but not limited to presence of viewers with a user, user preferences from a playlist, seed music, and ambient noise. As a result of device detected user preferences $305_n$, update profile $315_n$ may be performed.

Figure 4:
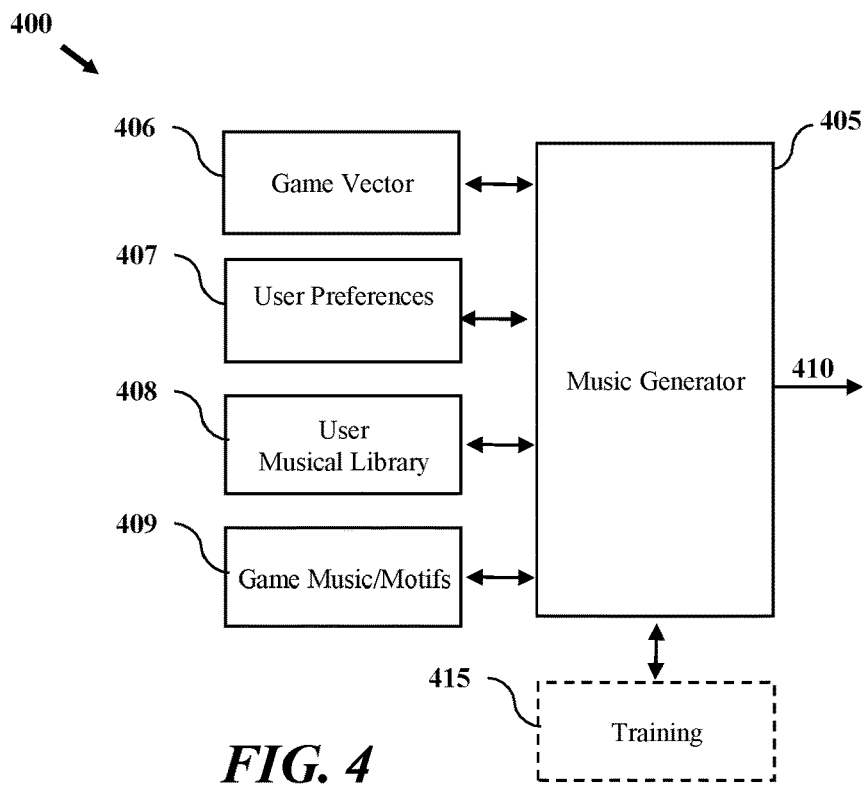
FIG. 4 illustrates a graphical representation of dynamic music generation according to one or more embodiments.

FIG. 4 illustrates a graphical representation of dynamic music generation according to one or more embodiments. According to embodiments, generation of gaming music may be performed dynamically, such that music and/or audio of an electronic game is determined and output during operations of a game. Dynamic music generation may employ use of one or more motifs that may be used to generate output. According to embodiments, dynamic gaming music generation 400 is performed by a music generator 405. Music generator 405 may be one or more components of a device, such as a controller or processor of a gaming console or electronic media player. Music generator 405 may be configured to output gaming music 410 based on one or more of game vector 406, user preferences 407, user musical library 408 and game music motifs 409. According to embodiments, a gaming console may generate and/or receive a game vector from game media, the game vector describing one or more operations and states of game play. The game vector may include a description of a game play scenario, game play type or mood associated with one or more game states. The game vector and one or more game states may be used to assess the type of music to generate. User preferences 407 are described above with reference to FIG. 3 and can provide one or more parameters for generating gaming music. User musical library 408 may provide one or more music titles which may be used a reference for generating music. For example, if a music library includes a particular type of music, such as techno, the type of music may be used as a reference for generating similar music. Game music motifs 409 may be provided by one or more of game media and a server to provide one or more musical elements that may be used to generate music. In certain embodiments, gaming music 410 may be generated independently of prerecorded music for a particular title. In other embodiments, gaming music 410 may modify or incorporate one or more game specific motifs.

According to embodiments, dynamic gaming music generation 400 may optionally include training 415 of one or more parameters for generating music. While user parameters may be employed to select, modify and output variations of motifs, the parameters and building blocks for a device to generate music may require training. By way of example, merging of musical styles may require training of rhythmic patterns when combining. Alternatively, parameter combination of certain tones and frequencies may require training to modify tonal or melodic progressions. Accordingly, music generator 405 may receive updated parameters from training 415 for generation of gaming music. According to embodiments, training 415 may be performed on a different device (e.g., second device, companion device, network device, etc.) than a device (e.g., first device) running operations of music generator 405. By way of example, parameters for training 415 may be received from one or more communications, such as network communication, by a device running music generator 405, such that received training data and parameters may be used by music generator 405.

According to embodiments, music generator 405 may generate gaming music 410 as a stream of output to another device (e.g., display, TV, etc.) or one or more speakers. According to embodiments, generated gaming music may include one or more musical phrases that may be output in a looping manner. Gaming music 410 may include one or more tracks (e.g., lead track, bass track, rhythm track, etc.) that may be independently controlled.

Figure 5:
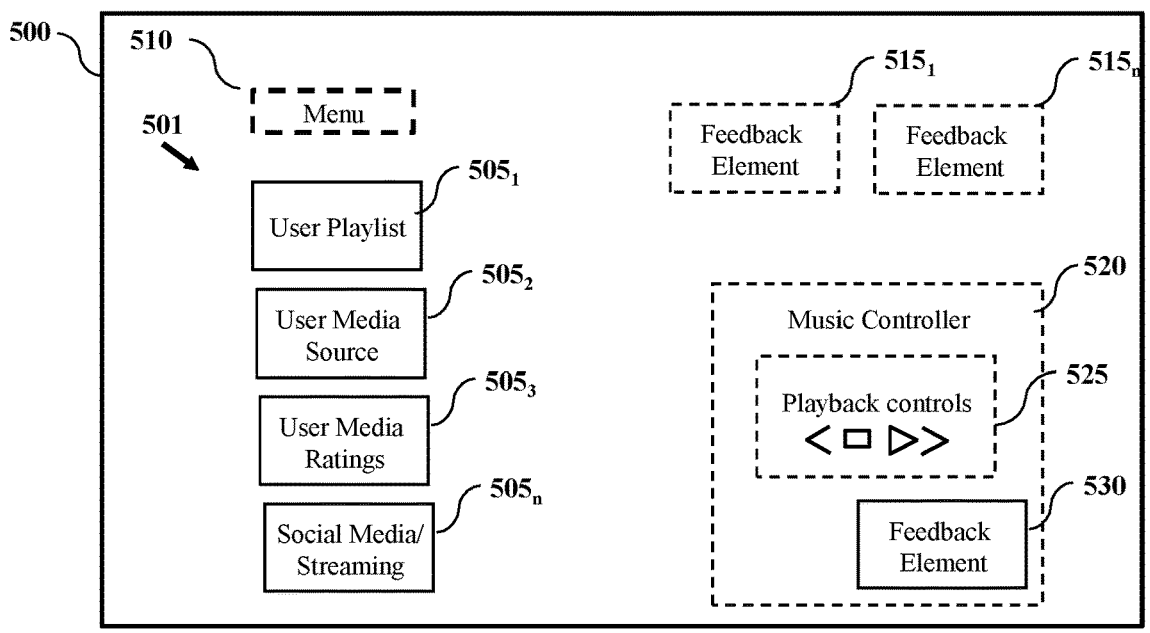
FIG. 5 illustrates a graphical representation of user interface according to one or more embodiments.

FIG. 5 illustrates a graphical representation of a user interface according to one or more embodiments. A device (e.g., device 105) may be configured to display one or more graphical elements for detecting gaming music preferences, including user preferences, user interactions and audio spectrum preferences. FIG. 5 illustrates display 500 which may include user interface 501. User interface 501 can include graphical elements $505_{1-n}$ which may be selected and/or controlled to provide sample or seed music for a gaming music generator. User playlist $505_1$ may be selected and/or interacted with to provide a gaming music generator access to song titles of interest to a user. User media source $505_2$ may be selected and/or interacted with to provide a gaming music generator access to one or more media files or media including music or audio, such as an external media player. User media ratings $505_3$ may be selected and/or interacted with to provide a gaming music generator access to song titles, artists, composers, musical tracks and audio sounds a user likes or dislikes. The ratings may be a reflection of the users affinity or distaste for certain music or sounds. Social media streaming $505_n$ may be selected and/or interacted with to provide a gaming music generator access to one or more network services that include audio and music responses.

According to embodiments, user interface 501 may include display of menu 510 for access to one or more display elements including one or more of feedback elements $515_{1-n}$ and music controller 520 to control playback of music. Elements of user interface 501 may be displayed as overlays and/or separately from game content. Feedback elements $515_{1-n}$ may be selected for providing feedback of gaming music output with game play and may include elements for approving, changing and disapproving gaming music. Music controller 520 may include playback controls 525 to advance, reverse, stop, and play music. Music controller 520 may include a feedback element 530 to provide feedback for gaming music. Music controller 520 may operate as an in-game element, such as a juke box, that a user can interact with to obtain information on user opinions of musical elements and compositions. Feedback from music controller 520 and/or feedback elements $515_{1-n}$ may be used to tune music generation to the player. The in-game element can be seeded with AI generated music clips that the AI could most benefit from player feedback about. Elements of user interface 501 may be accessed with an input device, such as a controller.

Figure 6:
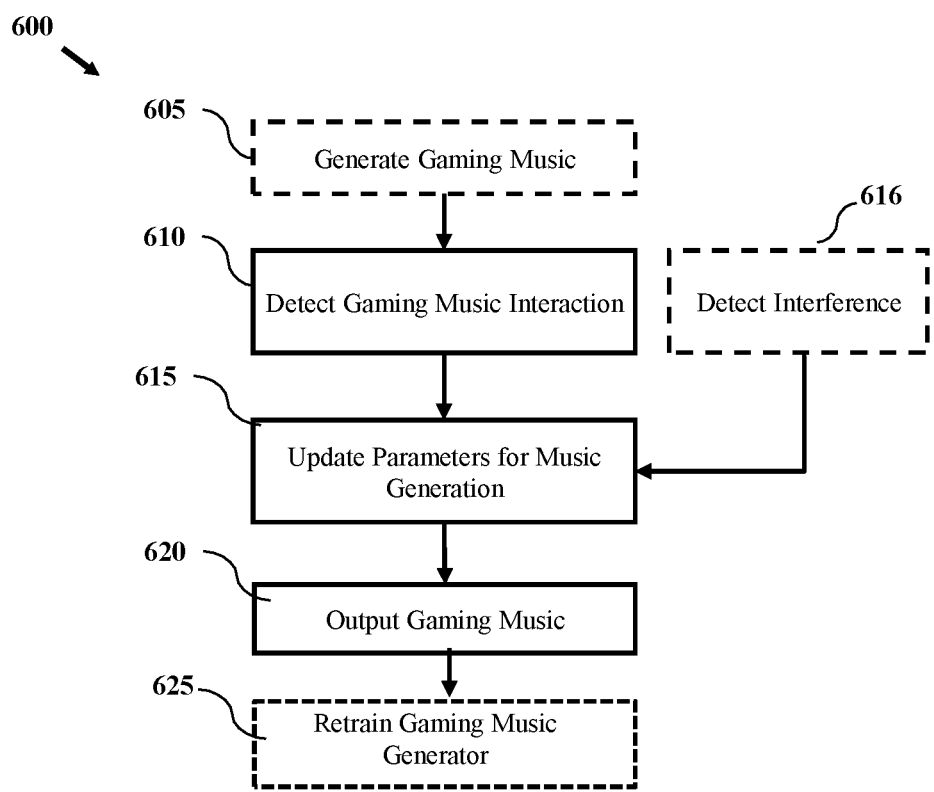
FIG. 6 illustrates a process for user interaction customized music generation according to one or more embodiments.

FIG. 6 illustrates a process for user interaction customized music generation according to one or more embodiments. According to embodiments, one or more interactions may be detected to modify generation of gaming music. Interactions may include user inputs to a gaming system for controlling gaming operation. According to embodiments, user interactions can include features detected by a device (e.g., device 105) or system (e.g., system 100), such as the presence of one or more users, gaming environment and interference of sound.

Process 600 may be initiated by a device (e.g., device 105) detecting a gaming music interaction at block 610. According to embodiments, at least one user interaction with a gaming system may be collected during gameplay. Interactions between a user and gaming system or gaming device (e.g., device 105) may be used to train selections of musical compositions. In addition, output of sound during a game may be used to train/retrain music generation, especially when gaming music or generated sounds interfere with game sound output. Process 600 may use sensors, such that information obtained during play, such as a friend starting to play the game or a song in the background may be used to as parameters for generation of gaming music.

According to embodiments, user interactions can be obtained by displaying a user interface including a feedback display element for at least one of entry of a user preference and feedback on gaming music generated by the device. According to other embodiments, detecting the at least one user interaction includes receiving audio data from at least one sensor for sound elements in the user environment and/or receiving visual data from at least one sensor for presence of viewers in the user environment. Detecting an interaction can include receiving music seed material. Process 600 may optionally include generating music at block 605 such that gaming music is output when the interaction is detected. Generating gaming music at block 605 can include output of dynamic music based on training of a dynamic music generator and the at least one user interaction.

According to other embodiments, detecting the at least one user interaction includes detecting the presence of a user and one or more spectators in the environment of the device. Inputs may be provided by sensors of the gaming system to detect interactions and control of dynamic music during gameplay. According to embodiments, inputs may include detecting presence of viewers and user environment to modify at least one output characteristic of dynamically generated music. By taking the spectators into consideration, such as spectators in a living room, the music generated may be output to be appropriate for all ages. For example, when a child walks into the room while the father kills a zombie, the monster's sound can change to reduce the scare factor. Furthermore, spectator-generated sounds for those watching could account for their music preferences. Audio generated to appeal to spectators may avoid certain compensations that are specific to the player that may be distracting to other people spectating the game play. When spectators are present in the gaming environment, or if the content is being captured for streaming or sharing, then the AI game audio can ensure that the generated audio is appealing to a wide audience along with considering the player's preferences and audio needs. For example, when targeting the player and spectators the AI audio generation may avoid significantly increasing the volume of sounds in a frequency range that the player has a hearing deficit in and may instead play the audio in another range where the player does not have a hearing deficit in addition to or instead of playing that audio in the original frequency range.

At block 615, a parameter for dynamic music generation may be updated based on the at least one user interaction. Updating parameters may include modifying parameters for a dynamic music generator during gameplay, including modifying the music generation parameters to include or remove features. By way of example, generated music that is disliked by a user, as indicated by a user interaction to stop music, may be used to modify or remove the parameters for generating the music. Similarly, updating a parameter can include reinforcing a dynamic music generation parameter based on the at least one user interaction. Updating parameters can include updating a dynamic music generation parameter to remove music output based on the at least one user interaction.

Process 600 can include retraining dynamic music generation to avoid interfering with output of sound effects of the electronic game and to account for user interactions at optional block 625. At block 616, process 600 may optionally detect interference of gaming music output with audio output generated by a device. By way of example, if gaming music includes tonal elements similar to an output frequency and sound level of a sound effect, the gaming music may be considered as interfering. Accordingly, updating parameters for gaming music may shift tonal and/or frequency characteristics of gaming music to avoid interference.

At block 620, process 600 includes output of gaming music based on updated parameters for music generation. Process 600 may optionally include retraining of a gaming music generator at block 625. According to embodiments, retraining a music generator may be performed during game play, before gameplay, and/or between game sessions based on player interaction with the game. For example, if the player turns down the music volume in certain situations, it is a good sign that the music generated at those times is getting in the way of the game play or is not enjoyed by the player. Retraining can take into account the information obtained about one or more users between game sessions, such as viewing habits (e.g., movies, video clips, or TV shows the player has watched), and music associated with viewing habits. The information obtained about users may include sounds that a device detects, or subjects of interest from a social media stream. User information may be used to look up appropriate corresponding audio clips that can be used as examples for training the AI game audio. Such retraining of the AI game audio between game sessions can keep the game audio feeling fresh to the user and can help match the game audio to the player's mood for each session.

Retraining may be based on information obtained during game play, such as information obtained from a camera and/or microphone, along with information specific to the player, such as an indication that a friend started playing a game or that a particular song started playing in the background. Retraining can be performed to provide audio responsive to the current conditions in which the game is being played. According to embodiments, retraining during gameplay and/or between game sessions should account for the in-game players and spectators in the living room. Generated music can be tasteful and enjoyable for a group of friends playing a multi-player game by taking all in-game players into account during the retraining process. Similarly generated music can create new communities of gamers who enjoy generated music with specific characteristics. In addition, similarities in user music profiles can seed other users on a gaming platform. A device and/or system may be connected to or include a to determine if there are other people present in the gaming environment and may even determine other factors about those people, such as if they are watching the game play or are just passing by. When providing seed music for training, that seed can have a flag indicating if the seed cannot be used verbatim, such as if licensing is needed but not obtained. For seed material that cannot be used verbatim, a filter may be used to ensure that generated music is differentiable from seed material.

Figure 7:
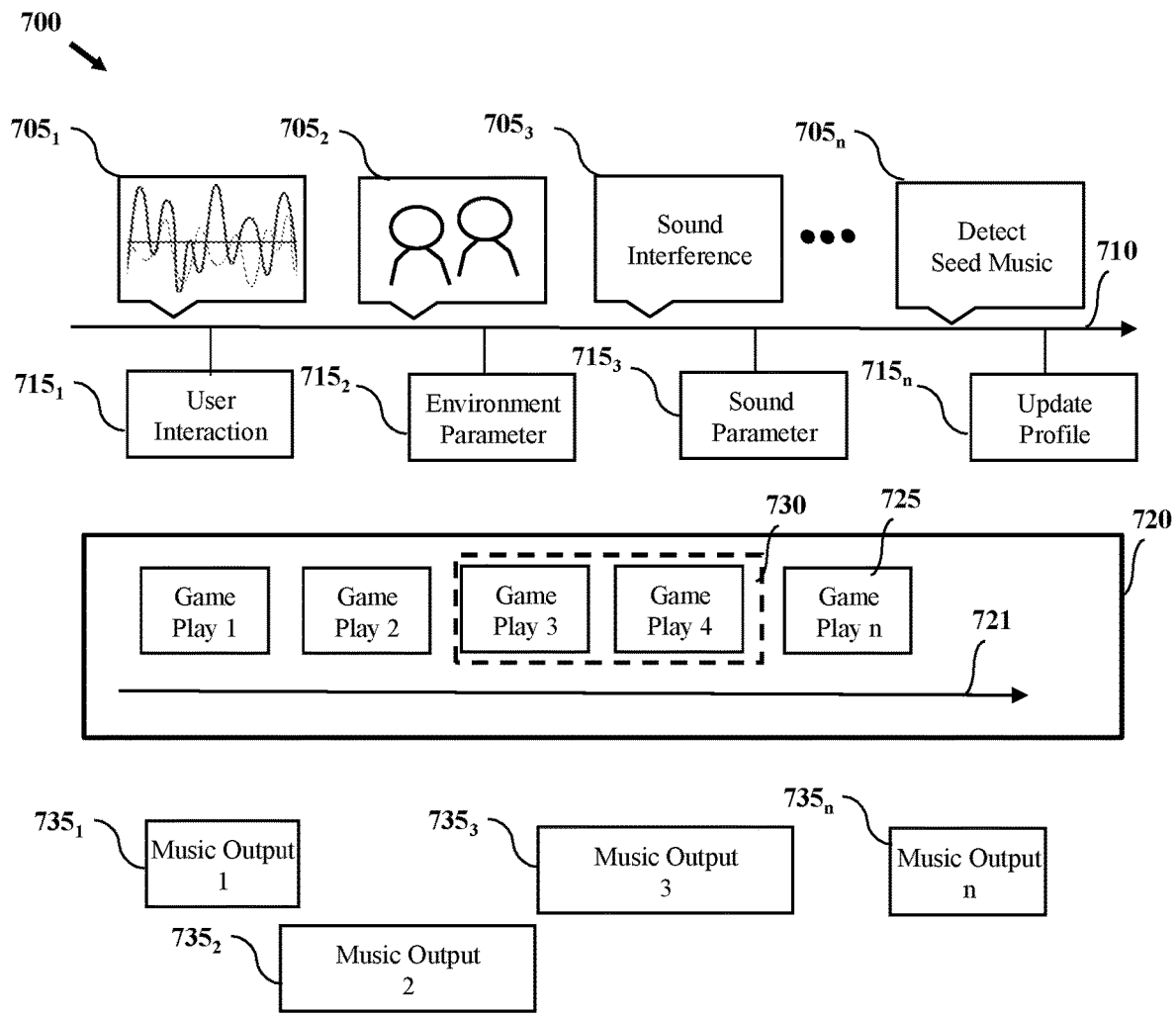
FIG. 7 illustrates a graphical representation of user interaction and gaming music training according to one or more embodiments.

FIG. 7 illustrates a graphical representation of user interaction and gaming music training according to one or more embodiments. According to embodiments, generating gaming music and generating game audio may be based on interactions with a device, such as a gaming console. A device may store interactions 700 for use in generating music and training a music generator. Interactions 700 may be detected during output of gaming music 710. According to embodiments, actions $705_1$ controlling output of gaming music can be detected as user interaction $715_1$. Actions $705_1$ can include reducing volume, increasing volume, muting or stopping music output. User/viewer presence $705_2$ can be detected as user interaction $715_2$. Sound interference $705_3$ can be detected as sound parameter $715_3$ to avoid. Received and/or detected seed music $705_2$ can used to update profile $715_n$.

Figure 8:
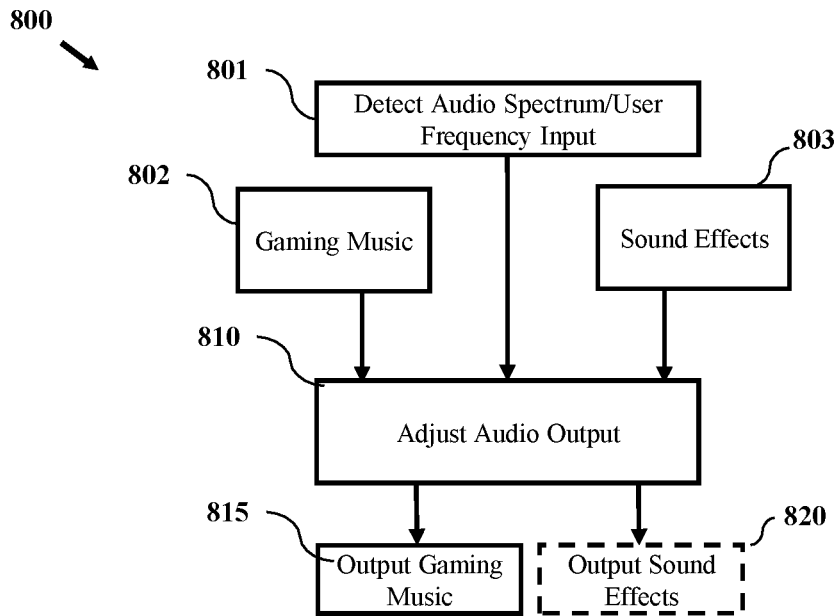
FIG. 8 illustrates a process for user customized audio generation according to one or more embodiments.

FIG. 8 illustrates a process for user customized audio generation according to one or more embodiments. Process 800 may be configured to adjust audio output based on one or more of generated gaming music, user input and sound effects of a game. Process 800 may be employed by a device, such as device 105 and/or controller 125 of FIG. 1, to generate gaming audio based on at least one user preference and to customize audio spectrum generation of gaming audio. Process 800 may also be performed to aid in generating audio output that is accessible and to improve device operation. Process 800 may be initiated by a device (e.g., device 105) detecting at least one audio spectrum input at block 801. The audio spectrum input 801 may be based on a sound test by a device to output at least one frequency tone and receiving at least one and receiving user feedback. The sound test can include display of at least one graphical element for receiving audio spectrum feedback. At least one audio spectrum input range may be identified that a user either cannot here or prefers to not here. According to embodiments, input may be detected for receiving sound output generated by a gaming system. For example, process 800 can include receiving as inputs gaming music at block 802 and sound effect at block 803.

At block 810, process 800 may include adjusting audio output. Updating at block 180 may be based on the at least one audio spectrum input, such as a desired frequency range or game audio. Updating a parameter for music generation in process 800 can include identifying a at least one frequency range to not include with generating gaming music. According to embodiments, updating a parameter can include shifting frequency output of gaming music.

When generating audio for a game, devices and systems herein can take into account content present and frequency ranges of audio in use. For example, if there is important audio that a player should hear in the game, such as a conversation between non-player characters (NPCs) or monsters approaching, process 800 can determine the frequency range or ranges for that audio and ensure that there is not much content in those frequency ranges are in the generated ambient sounds and music. This will ensure that other sounds do not mask the important audio and make it more difficult for the user to hear. This allows a game to have a musical accompaniment and feel more connected to other portions of the game play, avoiding a noticeable difference that would occur if the music stopped or suddenly became quieter when the user had something important to listen to.

The audio spectrum input 801 may allow a device to detect frequency ranges a user would like to avoid using. These frequency ranges can include a frequency range where the user has hearing loss, a high-pitched frequency range that annoys someone else in the house or wakes someone up, a frequency range that hits a resonance in the house and makes things vibrate, or a low frequency range that travels through walls and disturbs people in other rooms or apartments. The user can set the level of attenuation for each frequency range. Similarly, the user can set frequency ranges to boost, such as a frequency range where they have a partial hearing loss and thus need sounds in that range to be louder to be heard similarly to sounds in other ranges.

Audio generation for a game can take into account the different frequency ranges that are diminished, increased, or completely notched out. For example, a device can choose frequency ranges to use for the melody of the music that avoid such frequency ranges so that the volume of the melody appears the same to the player and other listeners as it changes in frequency, where a melody played in another frequency range may go in and out of a reduced frequency range and thus change significantly in volume from one note to the next. As another example, the device can shift the frequency of sound effects in the game, such as the sound of a machine running, footsteps, or a waterfall so that it avoids being within a frequency band that is diminished or notched out so that it can be heard.

Device and system configurations herein can use different frequency ranges to indicate different game conditions. For example, an increase in the overall volume in one frequency range can indicate that there are enemies nearby, while an increase in overall volume in another frequency range can indicate that there are traps or environmental hazards nearby, and an increase in the overall volume in a third frequency range can indicate that there are drops that the player can pick up nearby.

If there are multiple sounds from elements in the game environment, the ambient background sounds, speech, or music that are within the same frequency range, then a device can adjust the relative volumes of the different sound sources so that important sounds are not buried behind other sounds and become easy for a player to miss. Such volume adjustment may vary for different frequency ranges for a single sound source. The device may also shift a sound source up or down in pitch to have it in a different frequency range that does not compete with other sound sources. If the device notices that a particular frequency band has a lot of sound sources in it, it can indicate to the music generation to temporarily avoid having much going on in the music in that frequency band so that the music does not compete with other sound sources in the game and make game elements harder to hear.

The device can also change the pitch of sounds based on user preferences or reactions to sounds. For example, if the device detects a high-pitched baby cry is annoying to a user, it can shift that sound to a lower pitch to make it less annoying.

As music in the game becomes more dynamic and communicates more information about the game state to users there is more of a need to support users with hearing impairments. Traditional closed captioning generally indicates that music is playing but gives very little information about the music beyond that. There can be a visual indicator that can be turned on in-game that can indicate much of the information that the device uses to influence the real-time changes it makes in generating the music, such as the proximity to game elements in particular directions. If the graphics used for such an indicator are standardized across multiple games, it makes it easier for a user to learn and use when playing a new game. The graphics can also indicate when the music being played is being generated as the game is played rather than being a pre-composed piece. Such an indication can alert the user that changes in the music are likely triggered by things changing in the game environment.

At block 815, process 800 may include outputting gaming music. Generating gaming music at block 815 for a gaming system may be based on an updated parameter, where the gaming music is generated dynamically to include at least one musical motif, the at least one motif determined based on the parameter. Generating gaming music can include controlling volume to prevent disturbance of a user. Outputting the gaming music can include display of a graphical element to identify a gaming element as a component for generated music. Output of the gaming music can include output in coordination with output of gaming content. Process 800 may optionally include output of sound effects at block 820 based on adjustments at block 810.

Figure 9A:
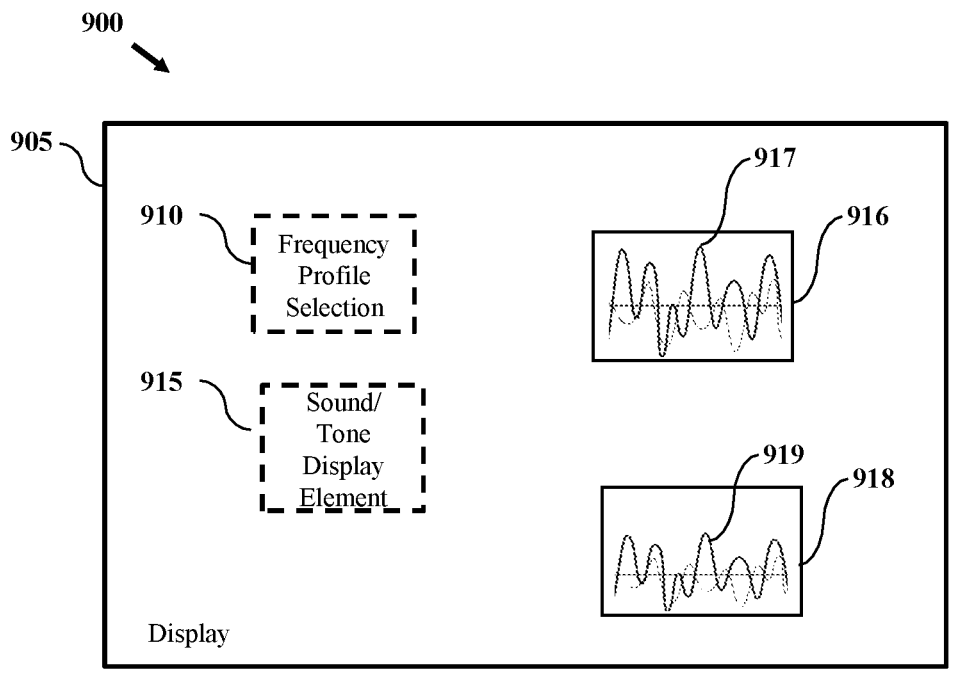
FIG. 9A illustrates a graphical representation of audio spectrum customization of gaming music according to one or more embodiments.

FIG. 9A illustrates a graphical representation of audio spectrum customization of gaming music according to one or more embodiments. According to embodiments a device (e.g., device 105) and system (e.g., system 100) may be configured to present user interface 900 on a display, such as display 905. User interface 900 can include one or more elements including frequency profile selection 910 and a sound/tone display element 915. Frequency profile selection 910 may allow a device to receive feedback for particular frequency ranges. Sound/tone display element 915 may allow a device to receive feedback for sounds or tones. User interface 900 may display a graphical element 916 illustrating a sound element, such as generated music or sound. Based on one or more interactions with frequency profile selection 910 and a sound/tone display element 915, a device may update the sound output. User interface 900 may display a graphical element 916 including the updated sound element. By way of ample, graphical element 916 includes a sound component 917 and graphical element 918 includes a sound component 919 modified from an prior output.

User interface 900 may be presented for configuration and player preferences, a system (e.g., system 100) can perform a hearing test on a user to identify hearing difficulty in one or more different frequency bands. For example, frequency bands of limited or no hearing, due to exposure to loud noises in a working environment. Hearing can also be limited to sounds that are masked by tinnitus at certain frequencies. User interface 900 may be employed to identify other hearing limits, such as the upper limit to the frequencies that the player can hear, which tends to decline as a person ages. User interface 900 may be used to perform a hearing test of a user by playing sounds at various frequencies and volumes and having the user respond when they hear a sound.

User interface 900 may be employed to detect differences between a user's left ear and right ear, by performing a test using headphones, or by covering one ear for a portion of the test and the other ear for another portion of the test. Differences in hearing between the ears can be used as parameters for audio generation. For example, audio generation may avoid generating sounds in a frequency range where a user has a significant hearing difference between the left ear and the right ear for elements where part of what is trying to be communicated is the direction to that element. Audio generation can choose to use a different frequency range when communicating that element of the game in the generated audio.

User interface 900 may be interoperate with elements of a system including a microphone to measure the frequency response of the speakers that the game audio will be played through and produce an audio playback profile. All speaker systems have resonant frequencies and frequencies that they produce less efficiently than others. Some speaker systems also have damage or other issues that negatively affect their sound generation. An audio playback profile can be generated by playing tones at various frequencies, or sweeping a tone through a range of frequencies, through each speaker individually and measuring the level of sound picked up by a microphone. Other known techniques for measuring the performance of an audio reproduction system can be used, such as measuring the playback of white noise. In some cases, a specialized calibrated microphone can be used. In some cases, a standard microphone, such as one that is sold to be part of a game system, such as a microphone for hearing voice commands or a microphone built into a game controller, can be used. In such a case, a calibration profile can be used to adjust for the frequency response of the microphone being used. In some cases, an unknown microphone can be used, in which case the calibration information will not be known, and the data collected will be less accurate, but may still be useful, such as detecting distortion or missing frequency ranges. The microphone should be located near where the player's ears will be located when playing while generating an audio playback profile.

An audio playback profile can be used to adjust the volumes of sound produced at various frequencies to get a flatter frequency response, which will result in the audio that is generated in the air matching the digital audio that the game generated more closely and will create sound that is more natural sounding and immersive for the player. The system can automatically apply the volume adjustments by frequency to get the flattest sound as possible out of each speaker.

This audio playback profile can also identify any frequency ranges where the system cannot adequately compensate by adjusting the volume for that frequency range. For example, a system with small speakers may not be able to reproduce certain low frequencies. As another example, a system may have a blown, damaged, or completely broken speaker cone. The system can also identify when there is distortion in the sound produced, such as from a blown or damaged speaker cone. In some cases the system can identify that playback of a certain frequency through a certain speaker hits a resonance frequency that causes something to vibrate or rattle around. The system can provide information about any frequency ranges that the game audio playback cannot fully reproduce to the game audio generation, which can use this information as it would use the player's hearing profile to adjust the generated audio.

If the hearing test is performed through the speakers that will be used for sound reproduction during the game, then the test will measure the combination of the player's hearing and the frequency response of the speakers the game audio will be played through. If an audio playback profile has been produced, then the audio playback profile can be used to determine which portion of the hearing test performed through the speakers is attributable to the player's hearing and which portion is attributable to the audio playback.

The system can make the player's hearing profile and system response profile available to games that are played on the system. In some cases, aspects of the system are implemented in individual game titles. Software libraries can provide code that supports including aspects of the system in individual game titles.

During game play, audio generation can detect when the system or player cannot adequately reproduce or hear sounds in the frequencies that the audio generation would normally have used. Audio generation can respond by using different frequencies to communicate the elements that it was going to communicate using frequencies that would not be effective.

In some cases, audio generation may indicate to other portions of the system or game code that it cannot fully communicate an element through audio to the player. For example, the element to communicate may be something that would normally be communicated through low frequencies that are felt more than heard, but the system that the game is being played on might not be able to produce much sound in the lower frequency ranges, such as game audio played through the speakers of an inexpensive TV. Examples of such elements can include an explosion, an earthquake, a sudden impact, or the rumble of a large stone moving across the ground. In such a case the element may also be communicated by other means, such as visually or through haptic feedback. For example, the intensity of the screen can flash to communicate a gunshot, or the display can shake to communicate an earthquake.

In some cases, the game system can use a microphone to measure the volume of the ambient sounds in different frequency ranges and provide that information to the AI audio generation. This competing audio could come from different sources, some of which will only last for a short duration, and some will last longer. For example, a kid in the room could start using a toy that makes a lot of noise in a particular frequency range. The AI audio generation can then use this information to detect when there is competing audio in the gaming environment in different frequency ranges and compensate for the fact that audio it produces for the game in a frequency range that currently has a lot of competing audio would be masked by the competing audio and would be harder to hear. Audio generation according to embodiments could compensate by raising the volume of sounds in that frequency range to compensate for them being harder to hear, or could compensate by moving sounds to a different frequency range where they will not compete with the ambient sounds.

Figure 9B:
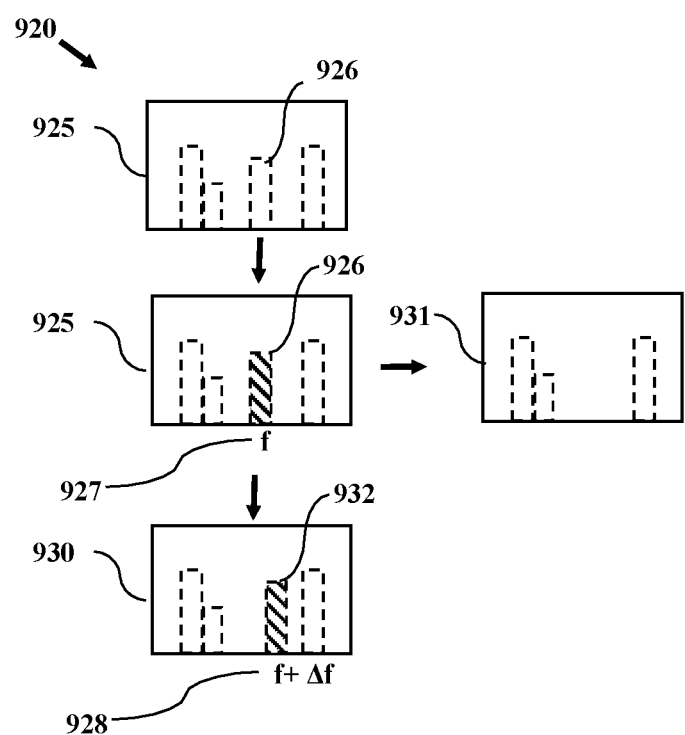
FIG. 9B illustrates a graphical representation of frequency range customization of gaming music according to one or more embodiments.

FIG. 9B illustrates a graphical representation of frequency range customization of gaming music according to one or more embodiments. According to embodiments, customized audio generation can include frequency ranged customization of gaming music according to one or more embodiments. Frequency customization may include change frequency of musical accompaniment based on other sound/auditory outputs of a gaming system, and preferences. Unlike changing tonality or musical composition selected for gameplay, frequency modification may selectively identify frequency ranges or tonalities that interfere with gameplay and/or ambient sounds.

Process 920 may include displaying graphical element 925 for frequency ranges of audio output, including at least one frequency range, such as frequency component 926. Process 920 can allow a user to specify frequency ranges to avoid, such as a frequency range where user has hearing loss, that cause vibration, or that is a disturbance/unpleasant. Process 920 may also allow for shifting the frequency of sound effects of the game so that they are audible, output frequency increase in volume to indicate presence of gaming opportunities or threats, shifting or volume or pitch based on review of musical accompaniment and sound effects, and/or changes of pitch or frequency may be based on user preferences and/or reactions to sounds. Process 920 also allows for use of a visual indicator that can be displayed to indicated information that the AI uses to generate music such as proximity to gaming elements.

Based on one or more sound tests a device may determine that frequency component 926 having a frequency value 927 requires adjustment either due to hearing loss or interference. Process 920 can include identification of frequency value 927 and generation of gaming audio 930 with frequency component 926 shifted to a modified frequency value 928. According to embodiments, process 920 can include removal of frequency value 927 and generation of gaming audio 931 with the frequency component removed.

While this disclosure has been particularly shown and described with references to exemplary embodiments thereof, it will be understood by those skilled in the art that various changes in form and details may be made therein without departing from the scope of the claimed embodiments.

What is claimed is:

1. A method for user preference customized generation of gaming music, the method comprising:
   detecting, by a device, at least one user preference for gaming music, wherein the at least one user preference is detected by a controller of the device, the user preference including a music style;
   determining, by the device, a game state, wherein the game state is a current gaming situation within an electronic game, wherein the game state is detected by the controller of the device;
   generating, by the device, gaming music based on the at least one user preference and the game state by the controller of the device to customize the gaming music to the user preference, wherein the gaming music is dynamically created by the controller of the device to include at least one musical motif, the at least one musical motif selected by the controller of the device based on the at least one user preference and the game state, and wherein generating gaming music includes selecting a voicing and rhythm for the at least one musical motif based on the music style of the user preference; and
   outputting, by the device, the gaming music, wherein the controller controls output of the gaming music.

2. The method of claim 1, wherein the at least one user preference for gaming music includes at least one of a music genre, song title, identification of a musical artist, composer, user feedback, or musical preference.

3. The method of claim 1, wherein the at least one user preference for gaming music includes at least one of a country of origin, nationality, geographic region, religious affiliation, or language preference.

4. The method of claim 1, wherein detecting the at least one user preference for gaming music includes displaying a user interface including a feedback display element for at least one of entry of the at least one user preference or feedback on gaming music generated by the device.

5. The method of claim 1, wherein detecting the at least one user preference for gaming music includes determining the at least one user preference from user profile data, wherein the game state is detected from a game vector describing at least one of an operation or state of game play.

6. The method of claim 1, wherein the at least one musical motif includes an arrangement of a melody and rhythm, and wherein generating gaming music includes modifying output of the rhythm based on the at least one user preference for a music genre.

7. The method of claim 1, wherein generating gamming music includes selection of a musical motif of the at least one musical motif for game elements of the game state, wherein the selection of the motif is directed by the at least one user preference.

8. The method of claim 1, wherein generating gaming music includes selection of a music library based on the user preference and generating the gaming music from one or more motifs of the music library.

9. The method of claim 1, wherein generating gaming music includes selecting musical style based on tat least one of cultural parameter and language parameter.

10. The method of claim 1, wherein outputting the gaming music includes output of dynamic music in coordination with output of gaming content and controlling prominence of gaming music relative to output of gaming content.

11. A device configured for user preference customized generation of gaming music, the device comprising:
    a memory storing executable instructions; and
    a controller coupled to the memory, wherein the controller is configured to
      detect at least one user preference for gaming music;
      determine a game state, wherein the game state is a current gaming situation within an electronic game;
      generate gaming music based on the at least one user preference and the game state to customize the gaming music to the user preference, wherein the gaming music is dynamically created by the device to include at least one musical motif, the at least one musical motif selected by the device on the at least one user preference and the game state, and wherein generating gaming music includes selecting a voicing and rhythm for the at least one musical motif based on a music style of the user preference; and
      output the gaming music.

12. The device of claim 11, wherein the at least one user preference for gaming music includes at least one of a music genre, music style, song title, identification of a musical artist, composer, user feedback, or musical preference.

13. The device of claim 11, wherein the at least one user preference for gaming music includes at least one of a country of origin, nationality, geographic region, religious affiliation and language preference.

14. The device of claim 11, wherein detecting the at least one user preference for gaming music includes displaying a user interface including a feedback display element for at least one of entry of the at least one user preference or feedback on gaming music generated by the device.

15. The device of claim 11, wherein detecting the at least one user preference for gaming music includes determining the at least one user preference from user profile data, wherein the game state is detected from a game vector describing at least one of an operation or state of game play.

16. The device of claim 11, wherein the at least one musical motif includes an arrangement of a melody and rhythm, and wherein generating gaming music includes modifying output of the rhythm based on the at least one user preference for a music genre.

17. The device of claim 11, wherein generating gamming music includes selection of a musical motif the at least one musical motif for game elements of the game state, wherein the selection of the musical motif is directed by the at least one user preference.

18. The device of claim 11, wherein generating gaming music includes selection of a music library based on the user preference and generating the gaming music from one or more motifs of the music library.

19. The device of claim 11, wherein generating gaming music includes selecting musical style based on tat least one of cultural parameter or language parameter.

20. The device of claim 11, wherein outputting the gaming music includes output of dynamic music in coordination with output of gaming content and controlling prominence of gaming music relative to output of gaming content.

\* \* \* \* \*